No. 836,791. PATENTED NOV. 27, 1906.
J. WILCOX.
SPOKE TENON AND FELLY CLIP.
APPLICATION FILED JUNE 30, 1905.
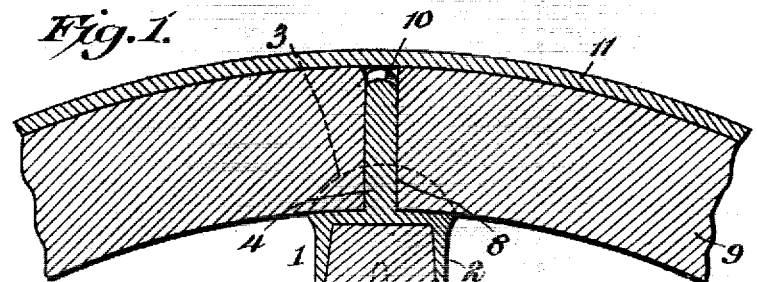
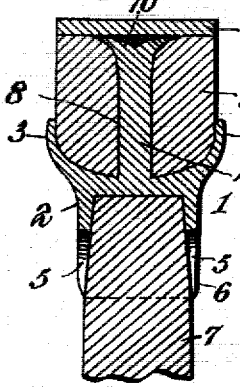
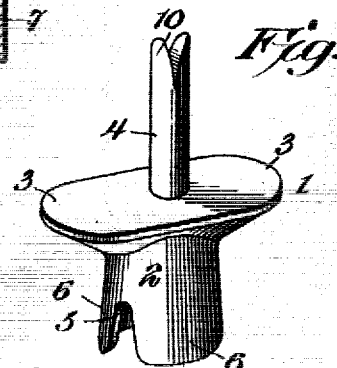
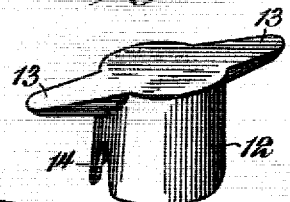
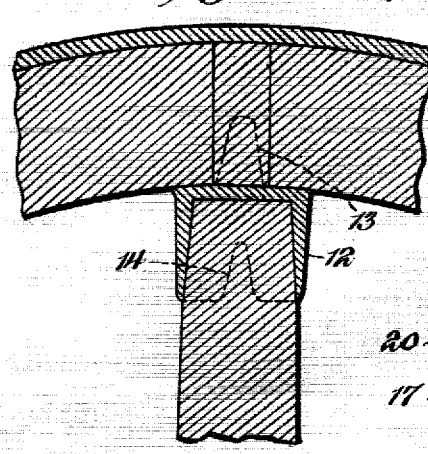
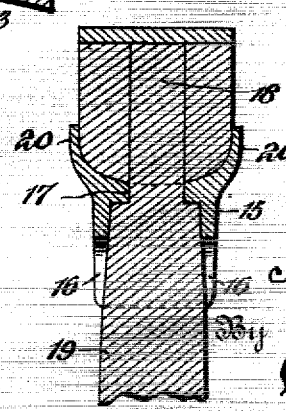
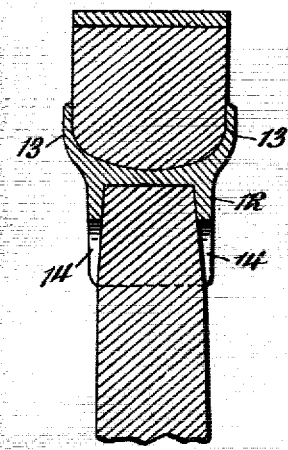
Witnesses
Howard D. Orr
H. F. Riley
Inventor,
Jacob Wilcox,
By E. G. Siggers
Attorney

UNITED STATES PATENT OFFICE.

JACOB WILCOX, OF AMLIN, OHIO.

SPOKE-TENON AND FELLY-CLIP.

No. 836,791.  Specification of Letters Patent.  Patented Nov. 27, 1906.

Application filed June 30, 1905. Serial No. 267,844.

*To all whom it may concern:*

Be it known that I, JACOB WILCOX, a citizen of the United States, residing at Amlin, in the county of Franklin and State of Ohio, have invented a new and useful Spoke-Tenon and Felly-Clip, of which the following is a specification.

The invention relates to a spoke-tenon and felly-clip.

The object of the present invention is to improve the construction of devices for connecting the outer end of a spoke to a felly, and to provide a simple, inexpensive, and efficient device designed to be applied to both new and old wheels and adapted to firmly grip both a spoke and a felly, whereby the former will be securely fastened to the latter and effectually prevented from becoming loose.

A further object of the invention is to provide a device of this character designed in repairing wheels to obviate the necessity of substituting a new spoke for a spoke broken off at the tenon and to provide a device adapted to be placed on the outer end of the spoke without removing the latter from the wheel and capable, when applied, of affording a firm bearing the entire width of the felly.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a longitudinal sectional view of a portion of a wheel provided with a device constructed in accordance with this invention. Fig. 2 is a transverse sectional view of the same. Fig. 3 is a perspective view of the device detached. Fig. 4 is a similar view of a device constructed for repairing broken spokes without removing the same from the wheel. Fig. 5 is a longitudinal sectional view showing the same applied to a spoke and a felly. Fig. 6 is a transverse sectional view of the same. Fig. 7 is a transverse sectional view illustrating another form of the invention and showing the device applied to a spoke having a tenon.

Like numerals of reference designate corresponding parts in all the figures of the drawings.

1 designates a spoke-holding and felly-clamping device designed particularly for use on new wheels and adapted to dispense with the spoke-tenon and comprising a spoke-receiving socket 2, felly-engaging lips or jaws 3, and a stem 4, which is adapted to take the place of the spoke-tenon. The felly-receiving socket is provided at opposite sides with slots or openings 5, forming two clamping sides or portions 6, which are adapted to be compressed against a spoke 7, whereby the same is firmly clamped and securely held in the socket. The stem 4 is arranged in an opening 8 of a felly 9, which is engaged at opposite sides by the lips or jaws 3. The outer end 10 of the stem is split or bifurcated to enable the stem to be clenched against the outer face or edge of the felly. The split portions are spread or upset against the outer face of the felly, as clearly illustrated in Fig. 2 of the drawings, suitable indentations being formed in the felly to receive the laterally-bent portions of the stem, so that the tire 11 will fit properly against the outer edge or periphery of the rim. The laterally-extending jaws or lips are bent against the opposite sides of the felly at the inner portion thereof, the device being constructed of suitable malleable material to enable this operation to be readily effected. The outer end face of the socket is flat, and the integral lips or jaws, before being bent against a felly, have upper or outer faces which are flush with the flat end face of the socket. The jaws or lips taper outwardly, and their lower faces are rounded, as shown. However, in applying the device to a new wheel the jaws or lips may be curved, as shown in Fig. 2, instead of being arranged flat, as illustrated in Fig. 3. The form of device illustrated in Figs. 1 to 3, inclusive, obviates the necessity of reducing the outer ends of spokes to form the usual tenon, and it affords a firm bearing the entire width of the felly.

In Figs. 4 to 6, inclusive, is illustrated a stemless device adapted to be applied to old wheels for repairing the same and capable, when a spoke is broken off at the tenon, of enabling the wheel to be repaired without removing the spoke. This form of device comprises a socket 12 and oppositely-extending lips or jaws 13. The spoke is sprung laterally beyond the felly to expose its lower end to enable the device to be placed on it. The socket 12 is provided at opposite sides with slots or openings 14, which form opposite clamping portions, and the latter are compressed around the spoke to clamp the same. The lips or jaws 13 are then bent against the opposite sides of the felly, which is also firmly gripped by the device. The device, when applied to a wheel in this manner, will tighten the spoke and firmly attach the same to the felly, and it will last as long as a wheel and be more effective than a new spoke, especially should the felly be battered or otherwise weakened. The lips or jaws 13 may be of any desired length, and they brace the felly at the point of attachment of the spoke. The form of device illustrated in Figs. 4 to 6, inclusive, may be constructed of any desired size to fit the character of the wheel to be repaired, and when it is applied to large or heavy wheels, with which it is impossible to spring the spokes outward to place the device on them, the device may have the clamping portions of the socket bent outward sufficiently to permit the device to be placed on the spoke without bending or springing the latter away from the felly.

In Fig. 7 is illustrated another form of the device, which is designed to be applied to new wheels or to wheels which when repaired require the removal of the tire and the felly. This form of the device comprises a spoke-receiving socket 15, provided with opposite slots 16 to form clamping portions and having a central opening 17 at the outer end of the socket to receive the tenon 18 of a spoke 19. The socket 15 is also provided with opposite felly-engaging lips or jaws 20, constructed like those heretofore described.

Having thus fully described my invention, what I claim as new, and desire to secure by Letters Patent, is—

1. A spoke-holding felly-clip, comprising a spoke-receiving socket having a flat outer end face, and split at opposite sides to provide compressible clamping portions, said spoke-receiving socket being interiorly tapered toward its outer end, and laterally-projecting jaws extending from opposite sides of the socket and having flat outer faces arranged flush with the outer end face of the socket, said jaws having round lower faces and adapted to be bent into engagement with a felly.

2. A spoke-holding felly-clip comprising a spoke-receiving socket having a flat outer end face and provided with compressible clamping portions, laterally-projecting jaws extending from opposite sides of the socket and having flat outer faces arranged flush with the outer end face of the socket, said jaws having rounded lower faces and adapted to be bent into engagement with a felly, and a stem extending from the flat end face of the socket, arranged centrally with respect to the same and having its outer end split.

3. A spoke-holding felly, comprising a spoke receiving and clamping socket having a plurality of clamping portions arranged to be compressed against a spoke, a stem extending from the socket and passing entirely through the felly, and having an outer split portion bent against the outer face or periphery of the felly, and opposite jaws extending from and formed integral with the socket and engaging the felly at opposite sides thereof.

In testimony that I claim the foregoing as my own I have hereto affixed my signature in the presence of two witnesses.

JACOB WILCOX.

Witnesses:
V. L. ALLEN,
JOHN G. KOEHLER.